United States Patent [19]
Wieszt

[11] Patent Number: 6,055,817
[45] Date of Patent: *May 2, 2000

[54] PROCESS FOR PROVIDING OUTSIDE TEMPERATURE INFORMATION FOR INFLUENCING THE VEHICLE AIR CONDITIONING

[75] Inventor: Herbert Wieszt, Grafenau, Germany

[73] Assignee: DaimlerChrysler AG, Stuttgart, Germany

[*] Notice: This patent issued on a continued prosecution application filed under 37 CFR 1.53(d), and is subject to the twenty year patent term provisions of 35 U.S.C. 154(a)(2).

[21] Appl. No.: 09/090,985

[22] Filed: Jun. 5, 1998

[30] Foreign Application Priority Data

Jun. 5, 1997 [DE] Germany .............. 197 23 521

[51] Int. Cl.$^7$ ...................................................... B60H 3/00
[52] U.S. Cl. .......................................... 62/133; 236/91 C
[58] Field of Search .............................. 62/133, 157, 158, 62/203, 239, 244, 323.1, 323.4; 236/91 R, 91 C, 91 D, 91 E, 91 F; 454/75; 165/202, 203, 204, 42, 43

[56] References Cited

U.S. PATENT DOCUMENTS

| | | | |
|---|---|---|---|
| 5,181,654 | 1/1993 | Yoshimi et al. | 236/91 C |
| 5,549,152 | 8/1996 | Davis, Jr. et al. | 236/91 C X |
| 5,644,924 | 7/1997 | Carr et al. | 62/133 |
| 5,653,386 | 8/1997 | Hennessee et al. | 62/133 X |

FOREIGN PATENT DOCUMENTS

| | | |
|---|---|---|
| 42 06 013 | 2/1993 | Germany . |
| 3-14716 | 1/1991 | Japan . |

*Primary Examiner*—Harry B. Tanner
*Attorney, Agent, or Firm*—Evenson, McKeown, Edwards & Lenahan, PLLC

[57] ABSTRACT

A process provides vehicle-air-conditioning-influencing outside temperature information for an outside-temperature-dependent air conditioning of a motor vehicle interior, in the case of which the outside temperature is sensed continuously and the air-conditioning-influencing outside temperature information is obtained from the pertaining sensor signal. During hold phases which are triggered when a defined starting condition occurs, the air-conditioning-influencing outside temperature information is held at its temperature value when the sensed outside temperature value rises or stays the same. The hold phase starting condition consists of the fact that the vehicle speed is lower than a definable speed threshold value and the temperature of the motor vehicle driving engine or of a coolant for the driving engine is higher than a definable engine temperature threshold value or coolant temperature threshold value.

7 Claims, 2 Drawing Sheets

PROCESS FOR PROVIDING OUTSIDE TEMPERATURE INFORMATION FOR INFLUENCING THE VEHICLE AIR CONDITIONING

BACKGROUND AND SUMMARY OF THE INVENTION

This application claims the priority of German Application No. 197 23 521.2, filed Jun. 5, 1997, the disclosure of which is expressly incorporated by reference herein.

The invention relates to a process for providing outside temperature information for the outside-temperature-dependent air conditioning of a motor vehicle interior, in which the outside temperature is continuously sensed and the outside temperature information, which influences the air conditioning, is obtained from the pertaining sensor signal. During hold phases, which are triggered with the occurrence of a defined starting position, the outside temperature information which influences the air condition is held at its temperature value in the event of a rising or unchanged sensed outside temperature value.

This type of a process is described in German Patent Document DE 42 06 013 C1. In that process, the outside temperature is sensed continuously, that is, in a timed manner at given time intervals, and from it, the outside temperature is obtained as a considerably damped sensor signal value in that the pertaining sensor signal is first subjected to a weak first damping and the weakly damped signal is then subjected to a strong second damping. During the hold phases, the outside temperature information which influences the air conditioning, despite a rising sensed outside temperature value, is not increased correspondingly but is held in this situation at its momentary temperature value. As a starting condition for the triggering of such hold phases, the selected condition there is that the vehicle speed fall below a definable speed threshold value of, for example, 30 km/h. This has the purpose of preventing, shortly after the parking of the vehicle, the outside temperature sensor signal from being used as the relevant outside temperature information for the air conditioning of the vehicle interior, which is then considerably influenced by the waste heat of the vehicle, for example, by the still hot vehicle engine, and therefore does not reflect the true outside temperature value. As a further measure, starting values as a function of the engine cooling water temperature are used during the starting of the vehicle as the basis of the weakly damped outside temperature value and the strongly damped outside temperature value. If the cooling water temperature is higher than a definable threshold value of, for example, 40° C., both damped outside temperature values are set to the stored, strongly damped outside temperature value existing at the time of the previous parking of the vehicle, whereas, if the cooling water temperature is lower or equal to the pertaining threshold value, both are set to the outside temperature value sensed at the point in time of the starting of the vehicle.

One problem of the known process consists of the fact that, whenever the vehicle is started in a colder environment, for example, in an underground garage, and is then driven at a low vehicle speed, which remains under the speed threshold value, into a warmer environment, for example, in the stop-and-go traffic outside the underground garage, the outside temperature information used for the air conditioning of the vehicle interior is held at the initial cooler temperature value although the vehicle is already situated in a clearly warmer outside environment.

The invention is based on the technical problem of providing a process of the above-mentioned type by which outside temperature information is provided for the air conditioning of the vehicle interior which takes place as a function of the outside temperature and is very appropriate for the respective situation.

The invention solves this problem by providing a process for providing outside temperature information for an outside-temperature-dependent air conditioning of a motor vehicle interior. The outside temperature is continuously sensed and, from the pertaining sensor signal, the air-conditioning-influencing outside temperature information ($T_B$) is obtained. During hold phases which are triggered when a defined starting condition occurs, the air-conditioning-influencing outside temperature information is held at its temperature value when the sensed outside temperature value rises or stays the same. The hold phase starting condition consists of the fact that the vehicle speed (v) is lower than a definable speed threshold value ($v_S$) and the temperature ($T_K$) of the motor vehicle driving engine or of a coolant for this driving engine is higher than a definable engine temperature threshold value or coolant temperature threshold value ($T_{KS}$).

In this process, the holding of the air-conditioning-influencing outside temperature information in the event of a rising or unchanging sensed outside temperature value, is in each case triggered only when not only the vehicle speed is lower than a definable speed threshold value but, in addition, the temperature of the motor vehicle driving engine or of its coolant is higher than a definable engine temperature threshold value or coolant temperature threshold value. By holding the air-conditioning-influencing outside temperature information constant at a low vehicle speed and when the engine temperature or coolant temperature is above the respective threshold value, it is prevented that, during a vehicle start, after only a brief stoppage, a sensed outside temperature value which is rising because of the still existing vehicle waste heat and is therefore falsified is used as the air-conditioning-influencing outside temperature information. On the other hand, this holding of the air-conditioning-influencing outside temperature information does not take place when the vehicle driving engine is not yet warm so that a rise of the sensed outside temperature value, which in this case is based on an actual increase of the outside temperature, is taken into account for the air conditioning of the vehicle interior. In particular, when driving out of a cooler underground garage with a still cold engine into the warmer outside environment, this rise of the outside temperature can immediately be taken into account for the air conditioning of the vehicle interior even if the vehicle is being driven very slowly at the time.

The selection of the engine temperature threshold value or coolant threshold value in the range of between approximately 55° C. and approximately 65° C. was found to be advantageous.

Other objects, advantages and novel features of the present invention will become apparent from the following detailed description of the invention when considered in conjunction with the accompanying drawings.

DETAILED DESCRIPTION OF THE DRAWINGS

Figure 1:
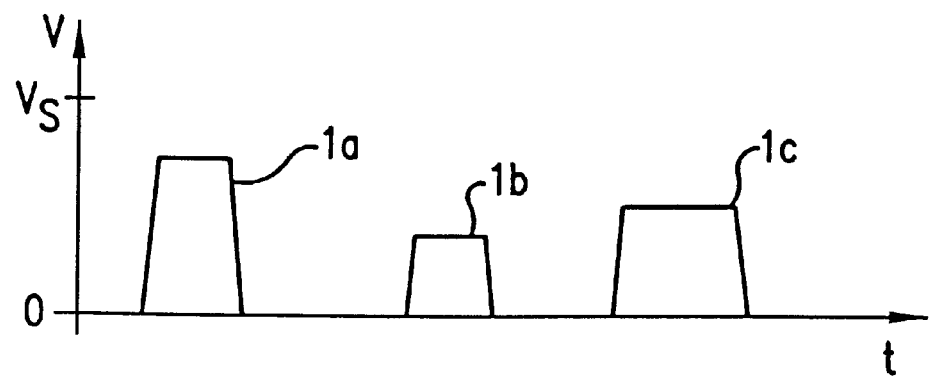
FIG. 1 is a diagrammatic view for illustrating the time-dependent course of the vehicle speed for a driving operation phase shown as an example.

In a speed—time diagram, FIG. 1 illustrates a driving operation phase during which a motor vehicle is driven from a cooler underground garage into a warmer outside environment and then moves there in stop-and-go traffic. The driving speed course illustrated in an idealized manner shows three moving phases 1a, 1b, 1c; that is, phases with a vehicle speed higher than zero, whereas the vehicle is otherwise standing while the engine is running. The first moving phase 1a corresponds to the driving out of the underground garage after which the vehicle enters stop-and-go traffic. The two other moving phases 1b, 1c therefore correspond to two successive starting and stopping operations in the stop-and-go traffic.

In the illustrated example of FIG. 1, the vehicle speed v always remains below a given speed threshold value $v_S$, which is significant for providing air-conditioning-influencing outside temperature information which represents an input parameter for air conditioning the vehicle interior, this information being provided according to the following process. By means of a conventional temperature sensor, which is arranged at a suitable point in the vehicle, the outside temperature, that is, the temperature at the corresponding point of the body shell of the vehicle, is sensed. From the pertaining sensor signal, the air-conditioning-influencing outside temperature information is then obtained. With respect to a direct use of the sensor signal as this air-conditioning-influencing outside temperature information, which is possible as an alternative, a time-smoothing processing of the sensor signal is preferred during which the air-conditioning-influencing outside temperature information is obtained by a time-related smoothing or averaging of the continuously detected sensor signal values which are, for example, queried in a timed manner at given intervals. This can take place, for example, by means of the conventional approach described in the above-mentioned German Patent Document DE 42 06 013 C1, in which the sensed outside temperature value experiences a two-step—first weak and then strong—damping, that is, time delay. By means of the time-related smoothing, short-term temperature jumps or peaks are prevented from influencing the air conditioning of the vehicle interior too much.

The air-conditioning-influencing outside temperature information, which is therefore obtained in one manner or another by means of the continuously sensed outside temperature, will then, before it is supplied to a corresponding air conditioner, such as a vehicle air conditioner, as an air-conditioning-relevant input information, be subjected to a hold decision step. In this process step, on the one hand, the cooling water temperature of a cooling water circulating system detected by means of a conventional engine coolant sensor will then be queried as to whether it is higher than a coolant threshold value which can be defined arbitrarily, in which case threshold values between approximately 55° C. and 65° C. and, particularly, a threshold value of 60° C. lead to very satisfactory results. On the other hand, this decision step contains the query of whether the vehicle speed v is lower than the mentioned speed threshold value $v_S$ which can also be defined arbitrarily in an amount which is best suited for the respective application, for example, at 30 km/h.

As soon as both conditions queried in this decision step, which therefore in an AND-linked manner represent a corresponding hold phase starting condition, have been met, this is interpreted as the occurrence of the hold phase starting condition and a hold phase is then triggered, during which the air-conditioning-influencing outside temperature information is held at its temperature value, that is, is held constant, in the event of a rising or unchanged sensed outside temperature value. In contrast, a falling value of the sensed outside temperature is immediately taken into account when obtaining the air-conditioning-influencing outside temperature information; that is, the hold relates only to rising but not falling temperature values. If one of the two above conditions is no longer met, that is, the vehicle speed v has reached or exceeded the speed threshold value $v_S$, or the cooling water temperature has reached its threshold value or has fallen below it, the hold phase is terminated, in which case, as required, this can take place in a manner which is delayed by a definable time delay of, for example, 1 minute. Starting from its previously held temperature value, the air-conditioning-influencing outside temperature information is then freely determined again by means of the sensed outside temperature value and can then, in particular, also rise again.

Figure 2:
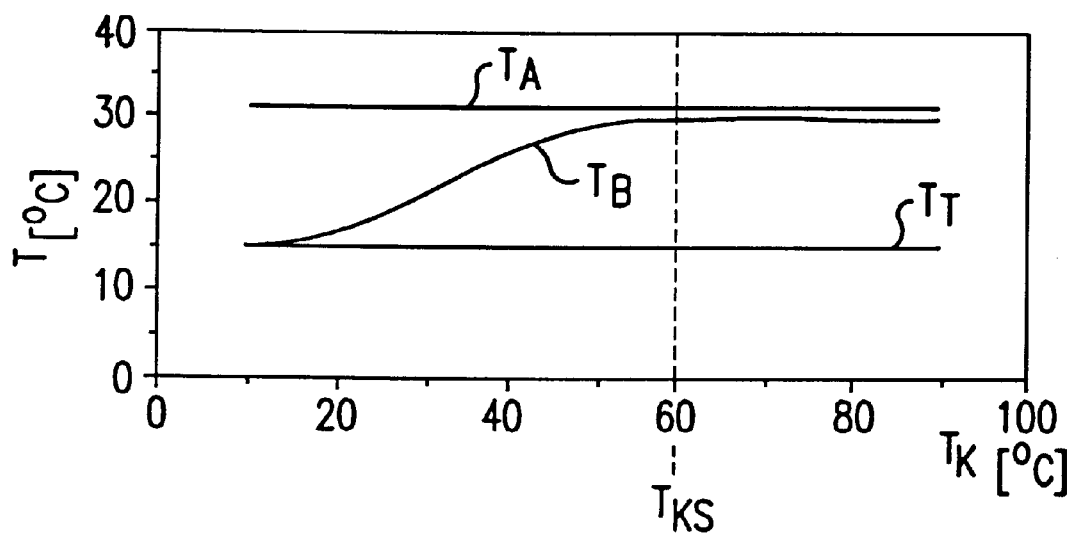
FIG. 2 is an outside temperature—cooling water temperature diagram for illustrating the temperature conditions during the driving operation phase of FIG. 1.

For the driving operation phase shown as an example in FIG. 1, this process results in the thermal behavior illustrated in FIG. 2. In the diagram of FIG. 2, the cooling water temperature $T_K$ is entered on the abscissa and, in this example of a starting vehicle, to an extent, corresponds to the variation in time of FIG. 1. The reason is that at the starting point during the starting of the vehicle, the cooling water temperature $T_K$, assuming a cold engine, is approximately at the ambient temperature and, during the subsequent driving operation, then rises to its value corresponding to the warmed-up engine. In each case, as a function of the cooling water temperature $T_K$ and thus correspondingly also of the time elapsed since the vehicle start, the diagram of FIG. 2 shows the horizontal line of the underground garage temperature $T_T$ of approximately 15° C. which remains constant; the horizontal line of the outside ambient temperature $T_A$ of approximately 31° C. which in the considered time period has also remained constant and is higher than the underground garage temperature $T_T$; and the course of the temperature value $T_B$ of the air-conditioning-influencing outside temperature information which forms the outside temperature input information which is relevant to the air conditioning of the vehicle interior.

As illustrated in FIG. 2, after the vehicle has driven out of the cooler underground garage, the air-conditioning-influencing outside temperature value $T_B$ rises because of the sensed outside ambient temperature value $T_A$ outside the underground garage which is higher than the underground garage temperature $T_T$. Because of the time-related sensor signal smoothing, this rise takes place in a delayed manner. However, it is not held at the lower underground garage temperature $T_T$ although the vehicle speed v is below the speed threshold value $v_S$ during the whole considered time period (FIG. 1). The reason is that, because of the cooling water temperature $T_K$, which is still below its threshold value of 60° C., the hold phase starting condition has at first not yet been met. Not before the cooling water temperature $T_K$ has reached its coolant temperature threshold value $T_{KS}$ of, for example, 60° C. and the vehicle speed v, as illustrated in FIG. 1, remains below its threshold value $v_S$. will a hold phase be triggered and the air-conditioning-influencing outside temperature value $T_B$ will then be held, that is, is not further increased when the sensed outside temperature value $T_A$ rises or remains the same. In contrast, if the sensed outside temperature $T_A$ falls, this is always taken into account for obtaining the air-conditioning-influencing temperature value $T_B$; that is, its hold always relates only to operating phases with a rising or unchanged value of the sensed outside temperature $T_A$.

As illustrated in FIG. 2, by means of the described process for providing an air-conditioning-influencing outside temperature information, it is achieved that, also when the vehicle is started in a cooler environment and is then parked or moved slowly in a warmer outside environment, the air-conditioning-influencing outside temperature value $T_B$ reliably changes from the initially cooler to the subsequently higher outside temperature value, while in this situation, in the case of the conventional approach according to German Patent Document DE 42 06 013 C1, it is held at the cooler initial outside temperature value. In addition, the present process according to the invention has all advantageous characteristics of this conventional process.

Figure 3:
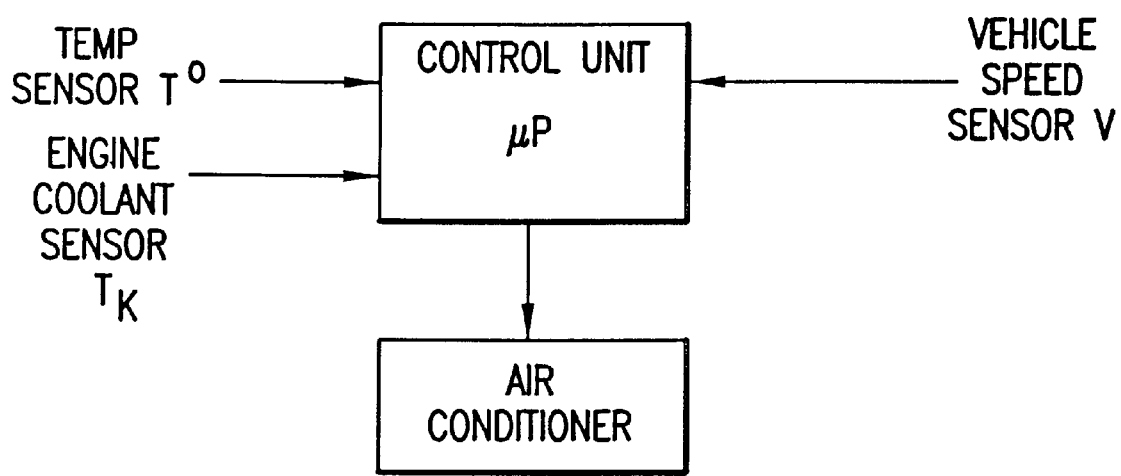
FIG. 3 is a general schematic block diagram of the apparatus according to the present invention.

FIG. 3 is a schematic block diagram of the apparatus for performing the process according to the invention. A control unit, such as a microprocessor, receives the input signals from the temperature sensor, engine coolant sensor and vehicle speed sensor. The above-described process steps can be, for example, performed by software operating in the control unit in order to provide an output signal to the vehicle air conditioner. Of course, the process according to the invention can also be provided by a hard-wired circuit or a combination of software and hardware.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for providing outside temperature information for an outside-temperature-dependent air conditioning of a motor vehicle interior, the process comprising the acts of:
    continuously sensing an outside temperature and providing a sensor signal thereof;
    obtaining air-conditioning-influencing outside temperature information from the sensor signal; and
    when a defined starting condition occurs, triggering hold phases wherein the air-conditioning-influencing outside temperature information is held at its temperature value when the sensed outside temperature value rises or stays constant, wherein the defined starting condition for a hold phase is when a vehicle speed is lower than a definable speed threshold value and a temperature of the motor vehicle driving engine or a coolant for the motor vehicle driving engine is higher than a definable engine temperature threshold value or coolant temperature threshold value.

2. The process according to claim 1, wherein the engine temperature threshold value or coolant temperature threshold value is in a range between approximately 55° C. and approximate 65° C.

3. A process for providing air-conditioning-influencing outside temperature information to an outside-temperature-dependent air-conditioner of a motor vehicle in which an outside temperature is continuously sensed, the process comprising the acts of:
    providing the outside temperature as the air-conditioning-influencing outside temperature information; and
    triggering hold phases when a defined starting condition occurs in which the air-conditioning-influencing outside temperature is held at a constant temperature value when the continuously sensed outside temperature rises or remains the same, wherein the defined starting condition for the hold phase is met when a vehicle speed is lower than a definable speed threshold value and one of a temperature of a motor vehicle engine and a coolant for the motor vehicle engine is higher than one of a corresponding definable engine temperature threshold value and coolant temperature value.

4. The process according to claim 3, wherein the engine temperature threshold value or the coolant temperature threshold value is in a range between approximately 55° C. and 65° C.

5. An apparatus for providing air-conditioning-influencing outside temperature information to an outside-temperature-dependent air-conditioner of a motor vehicle in which an outside temperature is continuously sensed via a sensor, the apparatus comprising:
    means for providing the outside temperature as the air-conditioning-influencing outside temperature information; and
    means for triggering hold phases when a defined starting condition occurs in which the air-conditioning-influencing outside temperature is held at a constant temperature value when the continuously sensed outside temperature rises or remains the same, wherein the defined starting condition for the hold phase is met when a vehicle speed is lower than a definable speed threshold value and one of a temperature of a motor vehicle engine and a coolant for the motor vehicle engine is higher than one of a corresponding definable engine temperature threshold value and coolant temperature value.

6. The apparatus according to claim 5, wherein the engine temperature threshold value or coolant temperature threshold value is in a range between approximately 55° C. and approximate 65° C.

7. A computer software product, comprising a computer readable medium, said computer readable medium having stored thereon code segments which:
    continuously sense an outside temperature;
    obtain air-conditioning-influencing outside temperature information from the continuously sensed outside temperature; and
    when a defined starting condition occurs, triggers hold phases wherein the air-conditioning-influencing outside temperature information is held at its temperature value when the sensed outside temperature value rises or stays constant, wherein the defined starting condition for a hold phase is when a vehicle speed is lower than a definable speed threshold value and a temperature of the motor vehicle driving engine or a coolant for the motor vehicle driving engine is higher than a definable engine temperature threshold value or coolant temperature threshold value.

\* \* \* \* \*